United States Patent
Schlipf et al.

(10) Patent No.: US 11,034,435 B2
(45) Date of Patent: Jun. 15, 2021

(54) WING FOR AN AIRCRAFT

(71) Applicant: Airbus Operations GmbH, Hamburg (DE)

(72) Inventors: Bernhard Schlipf, Hamburg (DE); Dort Daandels, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 224 days.

(21) Appl. No.: 15/928,895

(22) Filed: Mar. 22, 2018

(65) Prior Publication Data

US 2018/0273161 A1    Sep. 27, 2018

(30) Foreign Application Priority Data

Mar. 24, 2017   (DE) .................... 10 2017 106 445.1

(51) Int. Cl.
*B64C 13/34*   (2006.01)
*B64C 13/24*   (2006.01)
(Continued)

(52) U.S. Cl.
CPC ............... *B64C 13/34* (2013.01); *B64C 9/02* (2013.01); *B64C 9/14* (2013.01); *B64C 13/22* (2013.01);
(Continued)

(58) Field of Classification Search
CPC   B64C 13/34; B64C 13/28; B64C 9/02; B64C 9/14
See application file for complete search history.

(56) References Cited

U.S. PATENT DOCUMENTS

| 4,399,970 A | 8/1983 | Evans |
| 4,437,631 A | 3/1984 | Martens et al. |

(Continued)

FOREIGN PATENT DOCUMENTS

| CN | 103153784 A | 6/2013 |
| CN | 108622370 A | 10/2018 |

(Continued)

OTHER PUBLICATIONS

Final Office Action for U.S. Appl. No. 15/928,601 dated Apr. 15, 2020.

(Continued)

*Primary Examiner* — Richard R. Green
*Assistant Examiner* — Arfan Y. Sinaki
(74) *Attorney, Agent, or Firm* — Jenkins, Wilson, Taylor & Hunt, P.A.

(57) ABSTRACT

A wing for an aircraft including a slat, and a connection assembly for movably connecting the slat to the main wing. The connection assembly includes a first connection element movably mounted to the main wing and mounted to the slat, and a second connection element movably mounted to the main wing and mounted to the slat. The connection assembly includes a drive unit connected to the slat that includes a first and second drive station spaced apart in the wing span direction. The first drive station has a first input section, a first gear unit and a first output section connected to the slat. The second drive station has a second input section connected to the drive shaft, a second gear unit, and a second output section connected to the slat. The drive unit includes a sync shaft coupling the first output section to the second output section.

10 Claims, 7 Drawing Sheets

(51) Int. Cl.
    *B64C 13/28*     (2006.01)
    *B64C 13/22*     (2006.01)
    *B64C 9/14*      (2006.01)
    *B64C 9/02*      (2006.01)
    *B64C 3/50*      (2006.01)

(52) U.S. Cl.
    CPC .............. *B64C 13/24* (2013.01); *B64C 13/28* (2013.01); *B64C 3/50* (2013.01)

(56) References Cited

U.S. PATENT DOCUMENTS

| | | | |
|---|---|---|---|
| 4,470,569 | A | 9/1984 | Shaffer et al. |
| 4,650,140 | A | 3/1987 | Cole |
| 4,838,503 | A | 6/1989 | Williams |
| 7,048,234 | B2 * | 5/2006 | Recksiek ........... B64D 45/0005 244/213 |
| 7,464,896 | B2 * | 12/2008 | Carl ..................... B64C 13/341 244/99.2 |
| 8,127,912 | B2 | 3/2012 | Lang et al. |
| 8,245,982 | B2 * | 8/2012 | Vormezeele ............. B64C 9/22 244/214 |
| 8,511,619 | B2 | 8/2013 | Mann |
| 10,822,072 | B2 | 11/2020 | Schlipf et al. |
| 2002/0005462 | A1 | 1/2002 | Broadbent |
| 2005/0029407 | A1 * | 2/2005 | Pohl ........................ B64C 9/16 244/221 |
| 2006/0038088 | A1 | 2/2006 | Dodson |
| 2008/0229851 | A1 | 9/2008 | Jones |
| 2010/0163685 | A1 | 7/2010 | Vormezeele et al. |
| 2011/0120401 | A1 | 5/2011 | Scherzinger et al. |
| 2011/0168849 | A1 | 7/2011 | Parker |
| 2012/0325976 | A1 | 12/2012 | Parker |
| 2018/0274601 | A1 | 9/2018 | Saito et al. |
| 2018/0281927 | A1 | 10/2018 | Schlipf et al. |

FOREIGN PATENT DOCUMENTS

| | | | | |
|---|---|---|---|---|
| CN | 108622372 | A | 10/2018 | |
| DE | 3321128 | A1 | 12/1984 | |
| DE | 102011117706 | A1 * | 5/2013 | ............... B64C 9/16 |
| DE | 102014201239 | A1 | 7/2015 | |
| DE | 102015012237 | A1 | 3/2017 | |
| EP | 1985893 | A2 * | 10/2008 | ............. B64C 13/30 |
| EP | 2116467 | A1 | 11/2009 | |
| EP | 2202146 | A2 * | 6/2010 | ............... B64C 9/02 |
| EP | 2202146 | A2 | 6/2010 | |
| EP | 2902314 | A1 | 8/2015 | |
| EP | 3378760 | A1 | 9/2018 | |
| EP | 3378762 | A1 | 9/2018 | |
| GB | 540041 | A | 10/1941 | |
| GB | 2138756 | A | 10/1984 | |
| GB | 2138756 | B * | 7/1986 | ............... B64C 9/22 |
| WO | WO 2009/118547 | A1 | 10/2009 | |

OTHER PUBLICATIONS

European Office Action for Application No. 18161997.4 dated May 14, 2020.
European Office Action for Application No. 18160640.1 dated May 15, 2020.
Non-Final Office Action for U.S. Appl. No. 15/928,601 dated Jan. 8, 2020.
German Search Report for German Application No. 10217106445 dated Mar. 24, 2017.
German Search Report for German Application No. 102017106443 dated Mar. 24, 2017.
European Search Report for European Application No. 18160640.1 dated May 14, 2018.
European Search Report for European Application No. 18161997.4 dated May 17, 2018.
Advisory Action for U.S. Appl. No. 15/928,601 dated Jul. 6, 2020.
Notice of Allowance for U.S. Appl. No. 15/928,601 dated Aug. 5, 2020.
Chinese Office Action for Application No. 201810239395.9 dated Jan. 5, 2021.

* cited by examiner

WING FOR AN AIRCRAFT

CROSS-REFERENCE TO RELATED APPLICATION

This application claims priority to German Patent Application No. 10 2017 106 445.1 filed Mar. 24, 2017, the entire disclosure of which is incorporated by reference herein.

TECHNICAL FIELD

The present disclosure relates to a wing for an aircraft. The wing comprises a main wing, a slat, and a connection assembly for movably connecting the slat to the main wing, such that the slat can be moved between a retracted position and at least one extended position.

BACKGROUND

The connection assembly comprises a first connection element, such as a slat track or a linkage, and a second connection element, such as a slat track or a linkage. The first connection element is movably mounted to the main wing and is mounted to the slat. The second connection element is movably mounted to the main wing and is mounted to the slat in a position spaced apart from the first connection element in a wing span direction. Further, the connection assembly comprises a drive unit that is provided at the main wing and that is connected to the slat for initiating movement of the slat between the retracted position and the extended position. Specifically, the drive unit is arranged between the first and second connection elements, preferably centrally between the first and second connection elements. The drive unit comprises a first drive station and a second drive station spaced apart from one another in the wing span direction. The first drive station has a first input section connected to a drive shaft, a first gear unit and a first output section connected to the slat. The second drive station has a second input section connected to the drive shaft, a second gear unit, and a second output section connected to the slat. The first and second gear units transform high rotational speed with low torque from the first and second input sections (i.e. from the drive shaft) into low rotational speed with high torque at the first and second output sections.

For the wings known in the art, skew cases are possible where the first and second connection elements or the first and second drive stations do not move in sync and the slat might be skewed about a vertical axis.

SUMMARY

Therefore, an object of the present disclosure is to prevent such skew cases of the slat. This object is achieved in that the drive unit comprises a sync shaft coupling the first output section to the second output section for sync movement of the first and second output sections. In such a way the sync shaft provides that the first and second output sections move in sync, i.e. in parallel, so that due to the first and second drive stations being spaced apart in the wing span direction, the slat is prevented from skewing.

According to a preferred embodiment the first output section comprises a first rotating arm and a first link in the form of a drive strut. The first rotating arm is rotatingly coupled to the first gear unit at its one end and pivotably coupled to the first link at its opposite other end. The first link is pivotably coupled to the slat at its end opposite the first rotating arm. The second output section comprises a second rotating arm and a second link in the form of a drive strut. The second rotating arm is rotatingly coupled to the second gear unit at its one end and pivotably coupled to the second link at its opposite other end. The second link is pivotably coupled to the slat at its end opposite the second rotating arm. In such a way, an efficient drive unit is provided. As a preferred alternative to the rotating arm and link construction, the first and second output sections might also comprise rack and pinion drives, where a first pinion drives a first rack mounted to a first track that is mounted to the slat, and where a second pinion drives a second rack mounted to a second track that is mounted to the slat.

In particular, it is preferred that the sync shaft couples the first and second rotating arms, specifically is mounted to or engaged with the first and second rotating arms. In such a way, a reliable coupling is provided.

Preferably, the sync shaft is arranged coaxially with the axes of rotation of the first and second rotating arms. In such a way, the sync shaft is loaded with torque only.

It is further preferred that the sync shaft engages the first and second gear units and the first and second rotating arms are fixedly mounted to the sync shaft. This represents a simple and reliable construction.

Alternatively, it is preferred that the sync shaft is connected to the first and second rotating arms in a geared manner. In such a way, a flexible construction is provided as the sync shaft does not need to be mounted to the first and second rotating arms.

Alternatively, it is preferred that the sync shaft is fixedly mounted to the first and second rotating arms spaced apart in parallel from the axes of rotation of the first and second rotating arms. This allows that the drive shaft is arranged coaxially with the axes of rotation of the first and second rotating arms without interfering with the sync shaft.

According to another preferred embodiment, the sync shaft comprises a first shaft portion and a second shaft portion connected to one another via a coupling mechanism that provides torsional decoupling of the first and second shaft portions during normal operation of the connection assembly, and torsional coupling of the first and second shaft portions upon failure of one of the first and second drive stations. In such a way, constraint forces e.g. due to wing bending can be avoided during normal operation, while upon failure of one drive station the other drive station may still couple to the one drive station and drive the slat without skew.

In particular, it is preferred that the coupling mechanism is formed as a clutch, as a torsional play mechanism, such as a feather key connection, where a feather key has certain torsional play within a corresponding groove, or as a torsional compliance element having certain torsional elasticity. These represent simple and effective examples of a coupling mechanism.

According to another preferred embodiment, the drive shaft is arranged spaced apart from the sync shaft and from the axes of rotation of the first and second rotating arms, preferably parallel to the sync shaft and to the axes of rotation of the first and second rotating arms. In such a way, the drive shaft does not interfere with the sync shaft and the rotating arms.

According to yet another preferred embodiment, the drive shaft is arranged coaxially with respect to the axes of rotation of the first and second rotating arms. In particular, it is preferred that the sync shaft is arranged coaxially with respect to the drive shaft. Preferably, the sync shaft is hollow and formed coaxially around the drive shaft, wherein both the sync shaft and the drive shaft are arranged coaxially with respect to the axes of rotation of the first and second rotating arms. In such a way, a very compact construction is provided.

According to another preferred embodiment, the first input section and the second input section are formed integrally as one common input section, wherein the first gear unit and the second gear unit are formed integrally as one common gear unit. Preferably, the sync shaft is coupled to the common gear unit and the first and second rotating arms are mounted to the sync shaft. In such a way, only one common gear unit is provided which represents a simple construction.

According to a preferred embodiment, the first connection element and/or the second connection element is formed as a slat track that is guided at the main wing for translatory motion relative to the main wing, and that is fixedly mounted to the slat. The slat track might have a straight form or a curved form, viewed along their longitudinal extension.

According to an alternative preferred embodiment, the first connection element and/or the second connection element is formed as a linkage comprising two link elements that are spaced from one another and that are rotatably mounted to the main wing and rotatably mounted to the slat. Preferably, the link elements might be connected to the slat via a bar.

BRIEF DESCRIPTION OF THE DRAWINGS

Embodiments of the present disclosure are described hereinafter by a drawing. The example drawing shows in.

DETAILED DESCRIPTION

Figure 1:
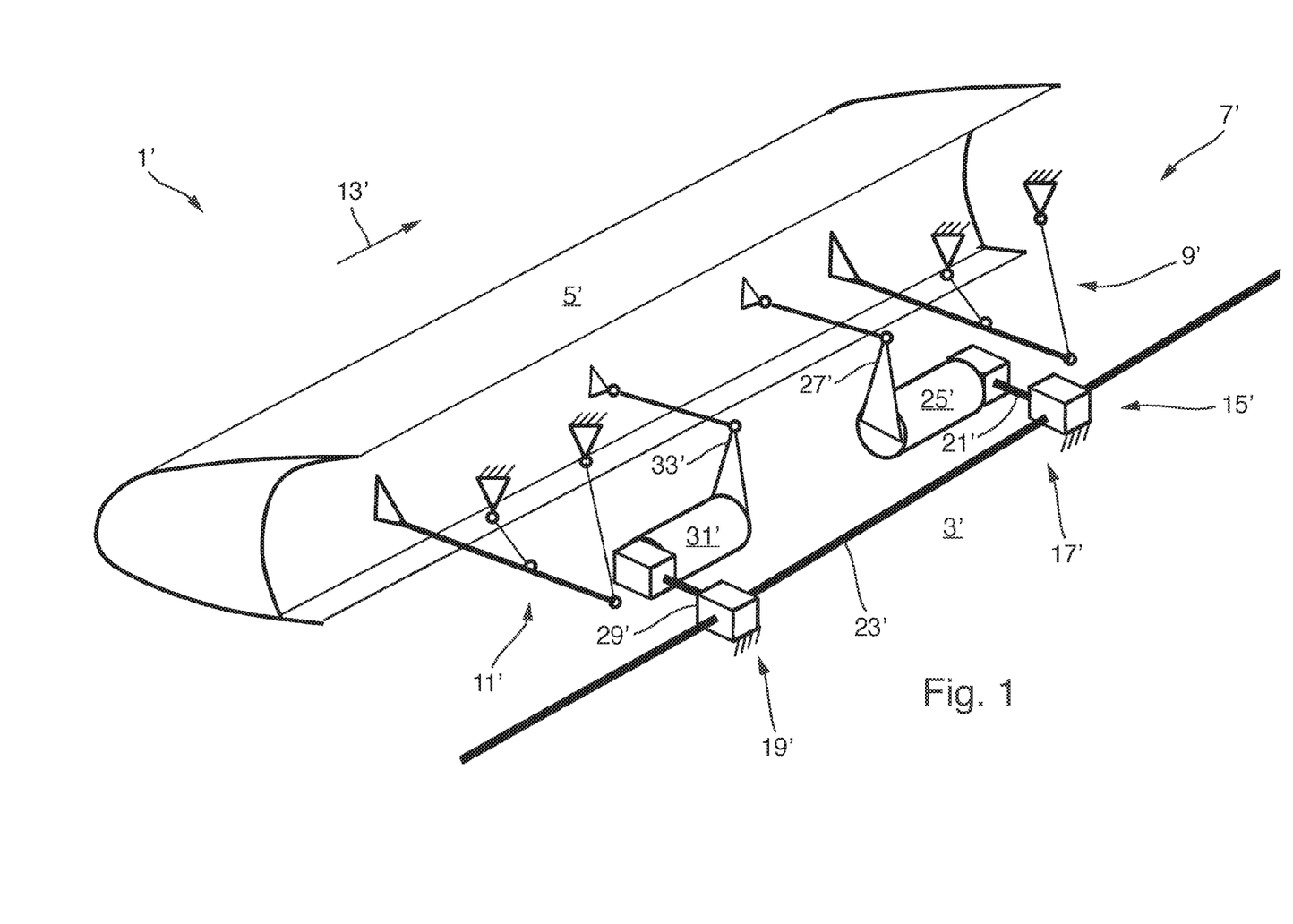
FIG. 1 a perspective view of a prior art wing on which the disclosure herein is based.

In FIG. 1, a prior art example of a wing 1' for an aircraft is shown. The wing 1' comprises a main wing 3', a slat 5', and a connection assembly 7' for movably connecting the slat 5' to the main wing 3', such that the slat 5' can be moved between a retracted position and at least one extended position.

The connection assembly 7' comprises a first connection element 9' and a second connection element 11'. Both the first connection element 9' and the second connection element 11' are movably mounted to the main wing 3' and are mounted to the slat 5'. The first and second connection elements 9', 11 are spaced apart from one another in a wing span direction 13'. The connection assembly 7' further comprises a drive unit 15' that is provided at the main wing 3' centrally between the first and second connection elements 9', 11', and that is connected to the slat 5' for initiating movement of the slat 5' between the retracted position and the extended position.

The drive unit 15' comprises a first drive station 17' and a second drive station 19' spaced apart from one another in the wing span direction 13'. The first drive station 17' has a first input section 21' connected to a drive shaft 23', a first gear unit 25' and a first output section 27' connected to the slat 5'. The second drive station 19' has a second input section 29' connected to the drive shaft 23', a second gear unit 31', and a second output section 33' connected to the slat 5'. The first output section 27' and the second output section 33' are not coupled to one another.

Figure 2:
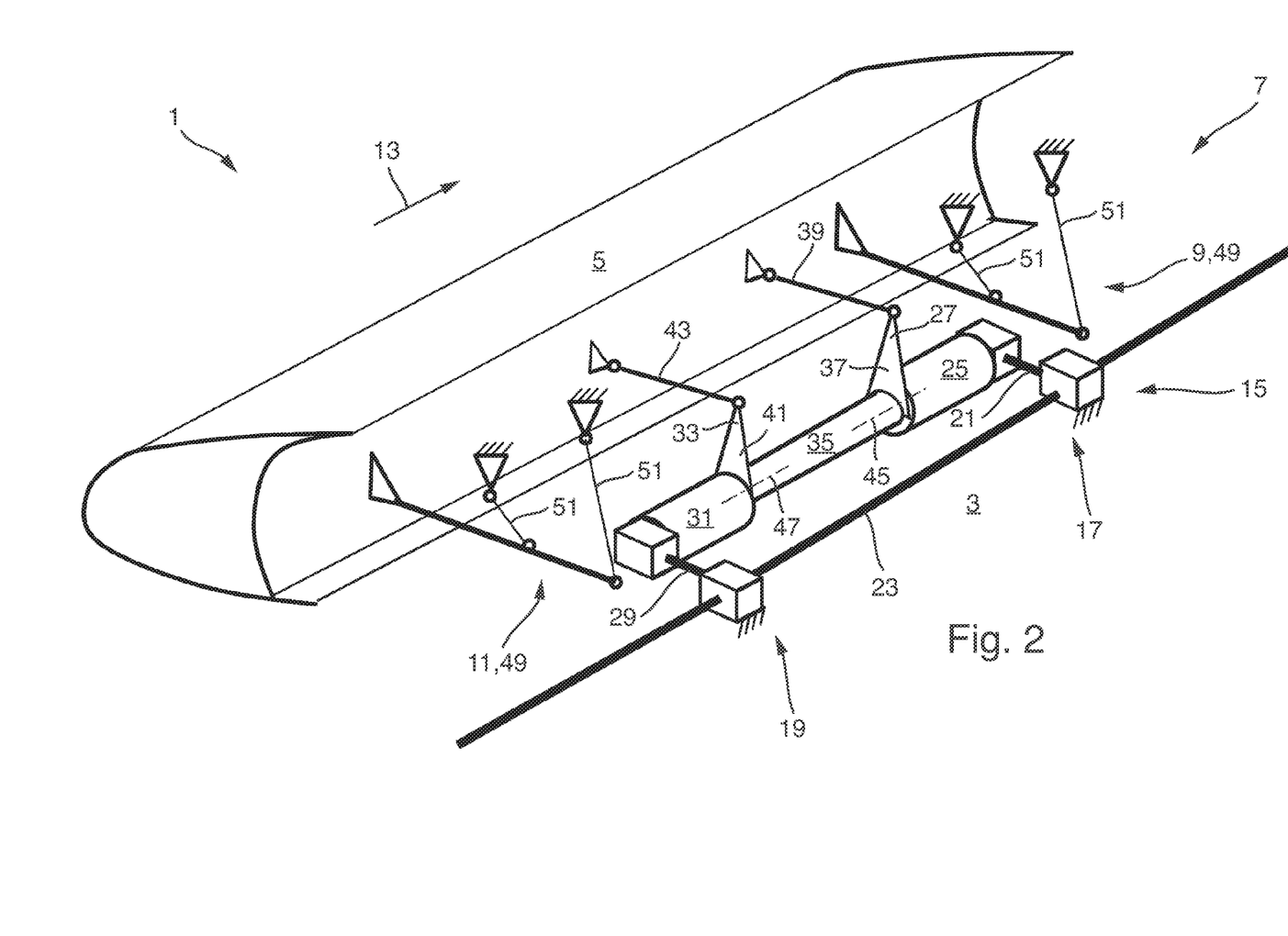
FIG. 2 a perspective view of a first embodiment of a wing according to the present disclosure.

In FIG. 2, a first embodiment of the wing 1 for an aircraft according to the present disclosure is shown, which generally corresponds to the prior art wing 1' shown in FIG. 1, but which differs from the prior art wing 1' by the drive unit 15 comprising a sync shaft 35 coupling the first output section 27 to the second output section 33 for sync movement of the first and second output sections 27, 33.

The wing 1 comprises a main wing 3, a slat 5, and a connection assembly 7 for movably connecting the slat 5 to the main wing 3, such that the slat 5 can be moved between a retracted position and at least one extended position.

The connection assembly 7 comprises a first connection element 9 and a second connection element 11. Both the first connection element 9 and the second connection element 11 are movably mounted to the main wing 3 and are mounted to the slat 5. The first and second connection elements 9, 11 are spaced apart from one another in a wing span direction 13. The connection assembly 7 further comprises a drive unit 15 that is provided at the main wing 3 centrally between the first and second connection elements 9, 11, and that is connected to the slat 5 for initiating movement of the slat 5 between the retracted position and the extended position.

The drive unit 15 comprises a first drive station 17 and a second drive station 19 spaced apart from one another in the wing span direction 13. The first drive station 17 has a first input section 21 connected to a drive shaft 23. The first drive station 17 further has a first gear unit 25 and a first output section 27 connected to the slat 5. The second drive station 19 has a second input section 29 connected to the drive shaft 23. The second drive station 19 further has a second gear unit 31 and a second output section 33 connected to the slat 5.

The first output section comprises a first rotating arm 37 and a first link 39. The first rotating arm 37 is rotatingly coupled to the first gear unit 25 and pivotably coupled to the first link 39. The first link 39 is pivotably coupled to the slat 5. The second output section 33 comprises a second rotating arm 41 and a second link 43. The second rotating arm 41 is rotatingly coupled to the second gear unit 31 and pivotably coupled to the second link 43. The second link 43 is pivotably coupled to the slat 5. The sync shaft 35 couples the first and second rotating arms 37, 41. The sync shaft 35 is arranged coaxially with respect to the axes of rotation 45, 47 of the first and second rotating arms 37, 41. In the present embodiment, the sync shaft 35 engages the first and second gear units 25, 31 and the first and second rotating arms 37, 41 are fixedly mounted to the sync shaft 35. However, the sync shaft 35 might also be connected to the first and second rotating arms 37, 41 in a geared manner.

The drive shaft 23, in the present embodiment, is arranged spaced apart from the sync shaft 35 and from the axes of rotation 45, 47 of the first and second rotating arms 37, 41, in parallel to the sync shaft 35 and in parallel to the axes of rotation 45, 47 of the first and second rotating arms 37, 41.

The first connection element 9 and the second connection element 11, in the present embodiment, are formed as linkages 49, wherein each linkage 49 comprises two separate link elements 51 that are spaced from one another and that are rotatably mounted to the main wing 3 and rotatably mounted to the slat 5. The link elements 51 are connected to the slat 5 via a bar 53 that is fixedly mounted to the slat 5 and rotatably mounted to both link elements 51 in spaced positions.

Figure 3:
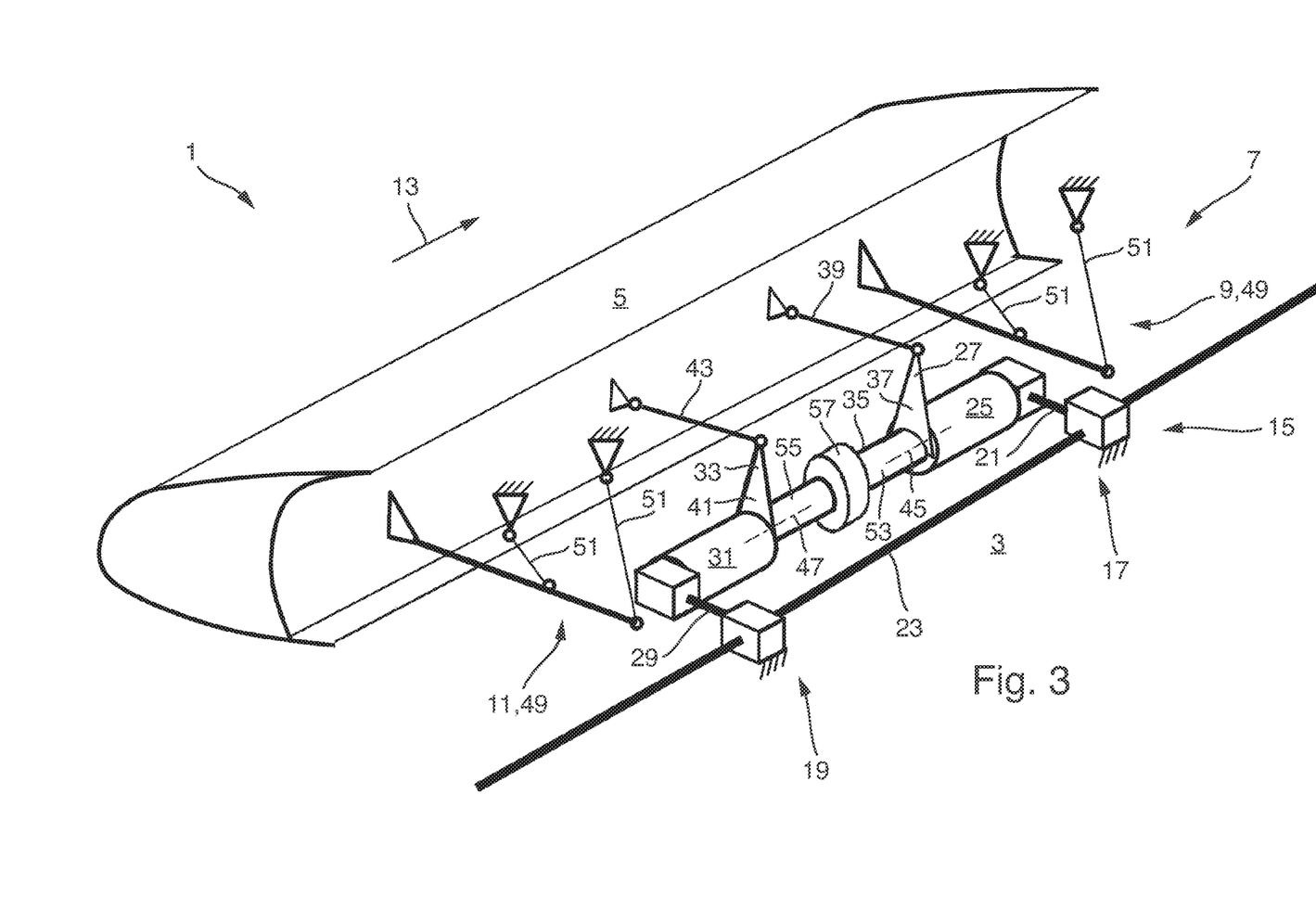
FIG. 3 a perspective view of a second embodiment of the wing according to the present disclosure.

In FIG. 3, a second embodiment of the wing 1 according to the present disclosure is show, which differs from the first embodiment by the sync shaft 35 comprising a first shaft portion 53 and a second shaft portion 55 connected to one another via a coupling mechanism 57. The coupling mechanism 57 provides torsional decoupling of the first and second shaft portions 53, 55 during normal operation of the connection assembly 7, and provides torsional coupling of the first and second shaft portions 53, 55 upon failure of one of the first and second drive stations 17, 19. The coupling mechanism 57, in the present embodiment, is formed as a clutch, but might also be formed as a torsional play mechanism, e.g. in the form of a feather key connection (not shown).

Figure 4:
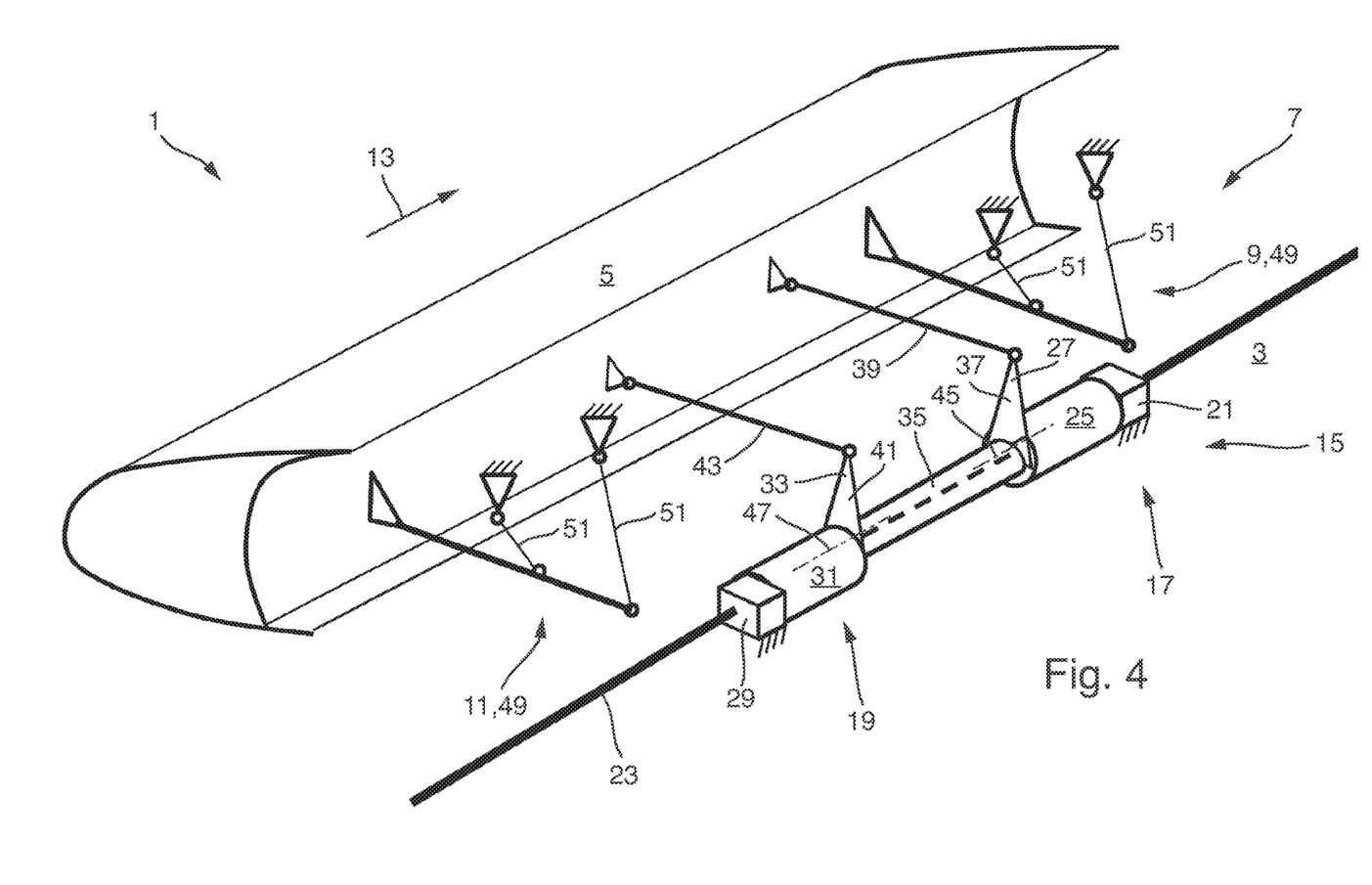
FIG. 4 a perspective view of a third embodiment of the wing according to the present disclosure.

In FIG. 4, a third embodiment of the wing 1 according to the present disclosure is show, which differs from the first embodiment by the drive shaft 23 being arranged coaxially with respect to the axes of rotation 45, 47 of the first and second rotating arms 37, 41 and with respect to the sync shaft 35. The sync shaft 35 is hollow and formed coaxially around the drive shaft 23, wherein both the sync shaft 35 and the drive shaft 23 are arranged coaxially with respect to the axes of rotation 45, 47 of the first and second rotating arms 37, 41.

Figure 5:
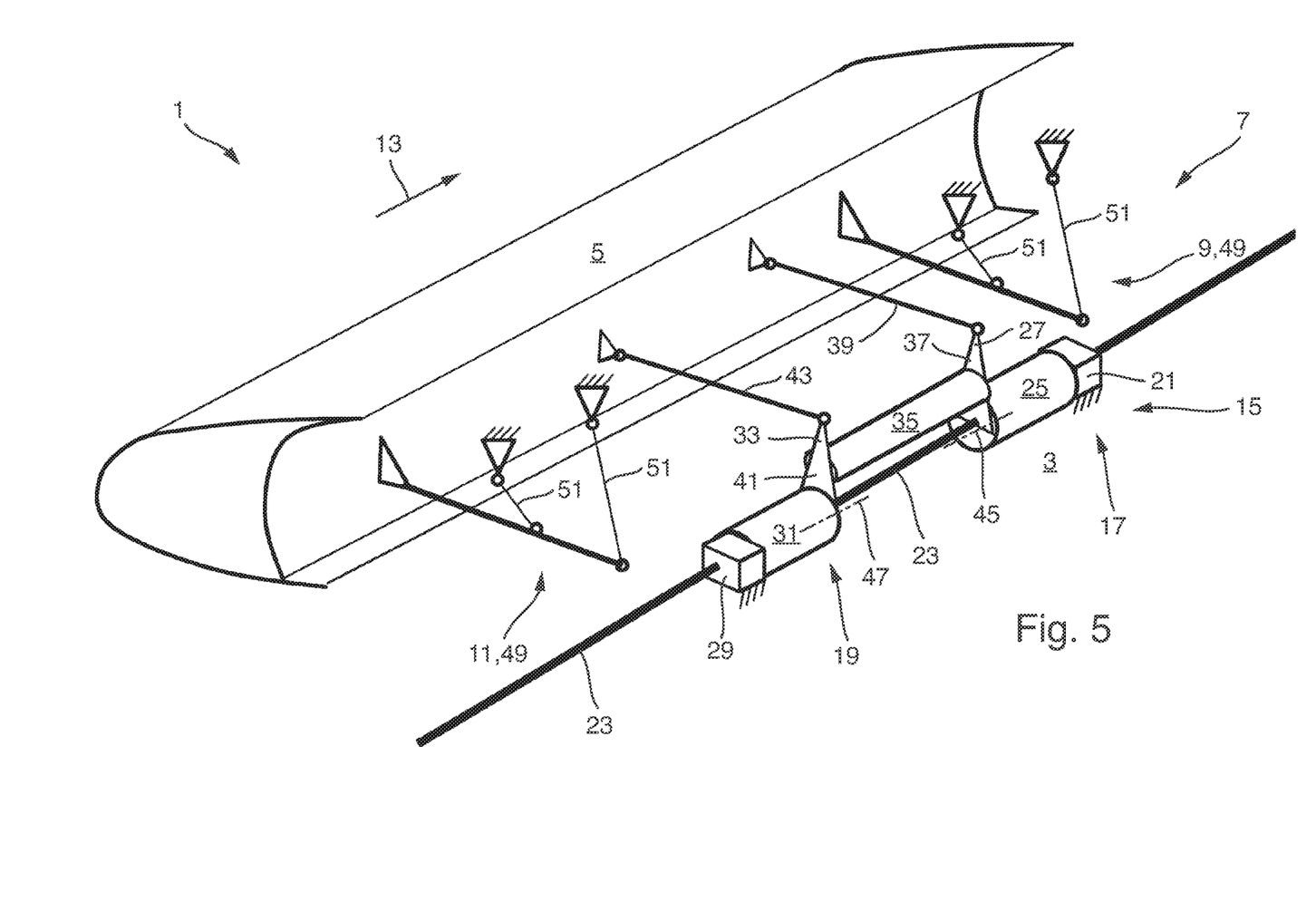
FIG. 5 a perspective view of a fourth embodiment of the wing according to the present disclosure.

In FIG. 5, a fourth embodiment of the wing 1 according to the present disclosure is show, which differs from the third embodiment by the sync shaft 35, instead of being arranged coaxially with respect to the axes of rotation 45, 47 of the first and second rotating arms 37, 41 and with respect to the drive shaft 23, being fixedly mounted to the first and second rotating arms 37, 41 spaced apart in parallel from the axes of rotation 45, 47 of the first and second rotating arms 37, 41, and spaced apart in parallel from the drive shaft 23 that, in turn, is arranged coaxially with the axes of rotation 45, 47 of the first and second rotating arms 37, 41.

Figure 6:
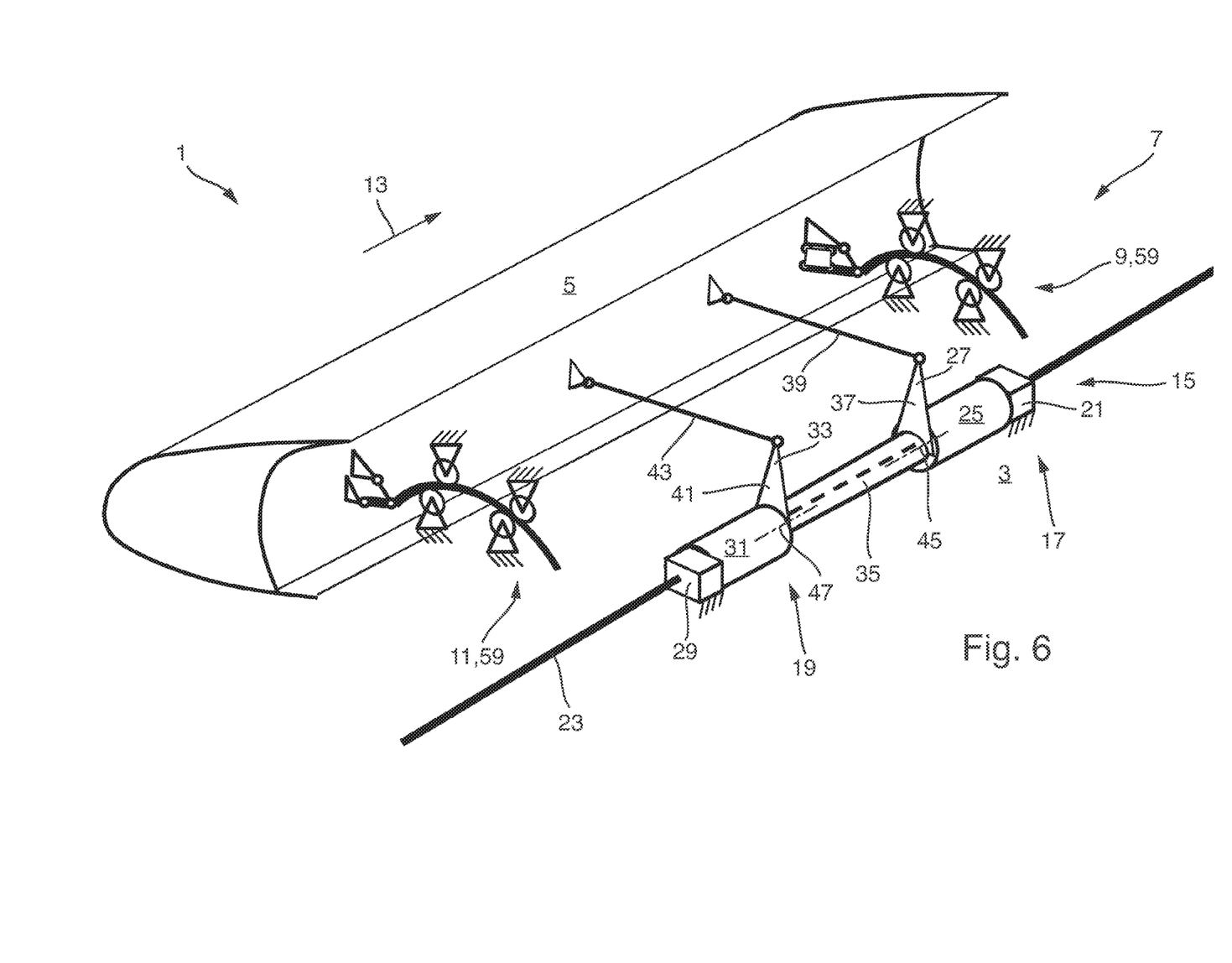
FIG. 6 a perspective view of a fifth embodiment of the wing according to the present disclosure.

In FIG. 6, a fifth embodiment of the wing 1 according to the present disclosure is show, which differs from the third embodiment by the first connection element 9 and the second connection element 11, instead of being formed as linkages 49, being formed as slat tracks 59 that are guided at the main wing 1 for translatory motion relative to the main wing 1, and that are fixedly mounted to the slat 5. The slat track 59 might have a straight form or a curved form, when viewed along their longitudinal extension.

Figure 7:
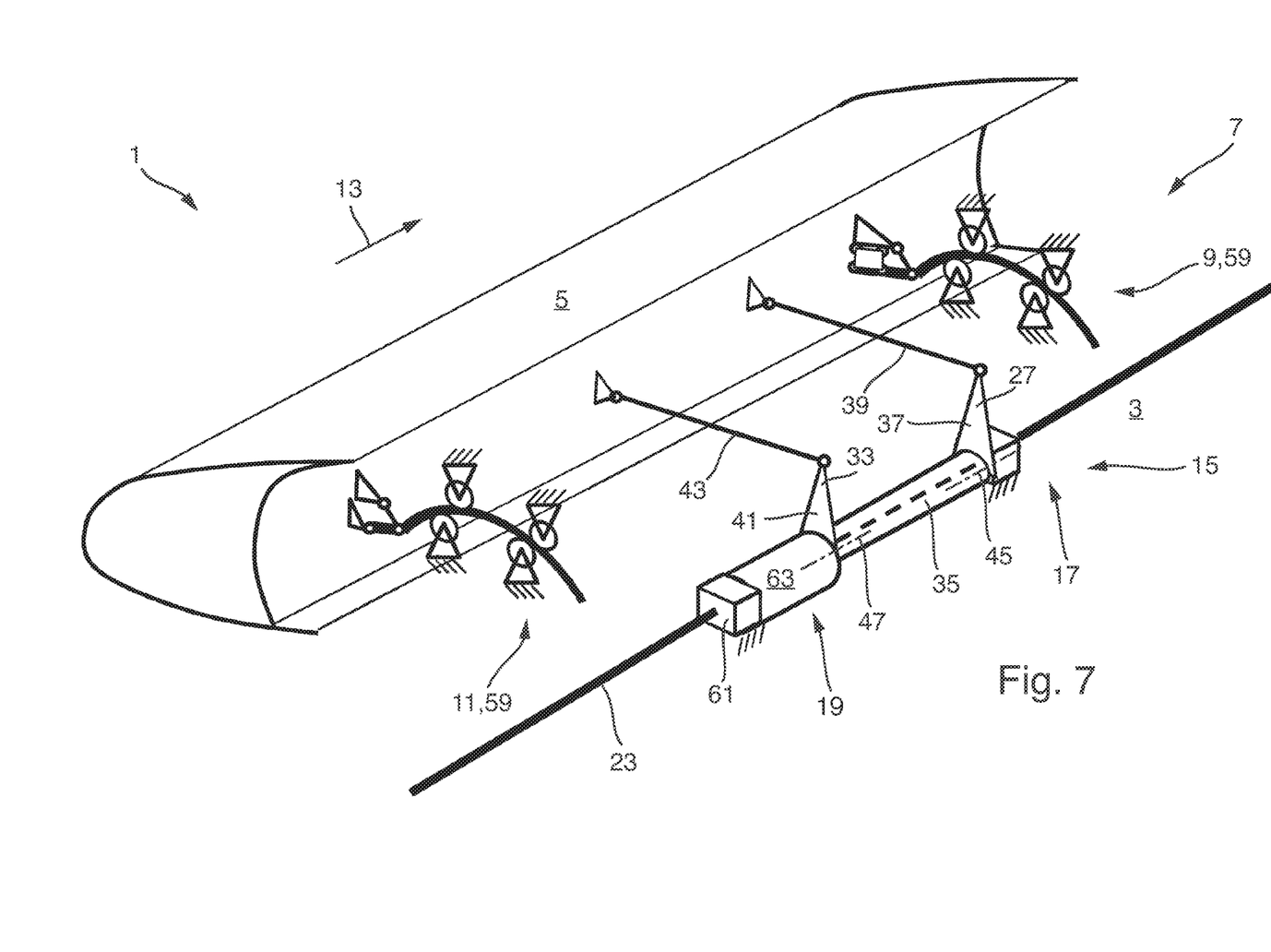
FIG. 7 a perspective view of a sixth embodiment of the wing according to the present disclosure.

In FIG. 7, a sixth embodiment of the wing 1 according to the present disclosure is show, which differs from the fifth embodiment by the first input section 21 and the second input section 29 being formed integrally as one common input section 61, and by the first gear unit 25 and the second gear unit 31 being formed integrally as one common gear unit 63. The sync shaft 35 is coupled to the common gear unit 63 and the first and second rotating arms 37, 41 are mounted to the sync shaft 35.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
   a main wing;
   a slat; and
   a connection assembly for movably connecting the slat to the main wing, such that the slat is movable between a retracted position and at least one extended position,
   wherein the connection assembly comprises a first connection element and a second connection element,
   wherein the first connection element is movably mounted to the main wing and is mounted to the slat,
   wherein the second connection element is movably mounted to the main wing and is mounted to the slat in a position spaced apart from the first connection element in a wing span direction,
   wherein the connection assembly further comprises a drive unit that is provided at the main wing and connected to the slat for initiating movement of the slat between the retracted position and the extended position,
   wherein the drive unit comprises a first drive station and a second drive station spaced apart from one another in the wing span direction,
   wherein the first drive station has a first input section connected to a drive shaft, a first gear unit and a first output section connected to the slat, and
   wherein the second drive station has a second input section connected to the drive shaft, a second gear unit, and a second output section connected to the slat,
   wherein the drive unit comprises a sync shaft coupling the first output section to the second output section for sync movement of the first and second output sections,
   wherein the first output section comprises a first rotating arm and a first link, wherein the first rotating arm is directly connected to the first gear unit and pivotably coupled to the first link, and wherein the first link is pivotably coupled to the slat, and wherein the second output section comprises a second rotating arm and a second link, wherein the second rotating arm is directly connected to the second gear unit and pivotably coupled to the second link, and wherein the second link is pivotably coupled to the slat,
   wherein the drive shaft is arranged spaced apart from the sync shaft and from an axis of rotation of the first and second rotating arms.

2. The wing according to claim 1, wherein the sync shaft couples the first and second rotating arms.

3. The wing according to claim 2, wherein the sync shaft is arranged coaxially with the axis of rotation of the first and second rotating arms.

4. The wing according to claim 3, wherein the sync shaft engages the first and second gear units and the first and second rotating arms are mounted to the sync shaft.

5. The wing according to claim 2, wherein the sync shaft is mounted to the first and second rotating arms spaced apart in parallel from the axis of rotation of the first and second rotating arms.

6. The wing according to claim 1, wherein the sync shaft comprises a first shaft portion and a second shaft portion connected to one another via a coupling mechanism that provides:
- torsional decoupling of the first and second shaft portions during normal operation of the connection assembly; and
- torsional coupling of the first and second shaft portions upon failure of one of the first and second drive stations.

7. The wing according to claim 6, wherein the coupling mechanism is a clutch or as a torsional play mechanism.

8. The wing according to claim 1, wherein the first connection element or the second connection element is a slat track that is guided at the main wing for translatory motion and that is mounted to the slat.

9. The wing according to claim 1, wherein the first connection element or the second connection element is a linkage comprising two link elements that are spaced from one another and that are rotatably mounted to the main wing and rotatably mounted to the slat.

10. A wing for an aircraft, comprising:
- a main wing;
- a slat; and
- a connection assembly for movably connecting the slat to the main wing, such that the slat is movable between a retracted position and at least one extended position,
- wherein the connection assembly comprises a first connection element and a second connection element,
- wherein the first connection element is movably mounted to the main wing and is mounted to the slat,
- wherein the second connection element is movably mounted to the main wing and is mounted to the slat in a position spaced apart from the first connection element in a wing span direction,
- wherein the connection assembly further comprises a drive unit that is provided at the main wing and connected to the slat for initiating movement of the slat between the retracted position and the extended position,
- wherein the drive unit comprises a first drive station and a second drive station spaced apart from one another in the wing span direction,
- wherein the first drive station has a first input section connected to a drive shaft, a first gear unit and a first output section connected to the slat, and
- wherein the second drive station has a second input section connected to the drive shaft, a second gear unit, and a second output section connected to the slat,
- wherein the drive unit comprises a sync shaft coupling the first output section to the second output section for sync movement of the first and second output sections,
- wherein the first output section comprises a first rotating arm and a first link, wherein the first rotating arm is rotatingly coupled to the first gear unit and pivotably coupled to the first link, and wherein the first link is pivotably coupled to the slat, and wherein the second output section comprises a second rotating arm and a second link, wherein the second rotating arm is rotatingly coupled to the second gear unit and pivotably coupled to the second link, and wherein the second link is pivotably coupled to the slat,
- wherein the drive shaft is arranged spaced apart from the sync shaft and from an axis of rotation of the first and second rotating arms;
- wherein the sync shaft couples the first and second rotating arms;
- wherein the sync shaft is connected to the first and second rotating arms in a geared manner.

* * * * *